United States Patent
Arnote, Jr. et al.

(10) Patent No.: US 7,066,803 B2
(45) Date of Patent: Jun. 27, 2006

(54) METHOD AND MEANS FOR STUFFING NATURAL CASINGS WITH SAUSAGE EMULSION

(75) Inventors: Kenneth B Arnote, Jr., Albion, IA (US); Brent R Schirm, Norwalk, IA (US)

(73) Assignee: Stork Townsend Inc., Des Moines, IA (US)

( * ) Notice: Subject to any disclaimer, the term of this patent is extended or adjusted under 35 U.S.C. 154(b) by 0 days.

(21) Appl. No.: 10/895,738

(22) Filed: Jul. 21, 2004

(65) Prior Publication Data

US 2006/0035574 A1    Feb. 16, 2006

(51) Int. Cl.
  *A22C 11/00*    (2006.01)
(52) U.S. Cl. ...................................................... 452/32
(58) Field of Classification Search ................. 452/21, 452/22, 24–26, 30–35, 37, 46, 51
  See application file for complete search history.

(56) References Cited

U.S. PATENT DOCUMENTS

| | | | |
|---|---|---|---|
| 3,964,128 A * | 6/1976 | Townsend et al. ............. | 452/38 |
| 4,438,545 A * | 3/1984 | Kupcikevicius et al. ...... | 452/32 |
| 4,493,130 A * | 1/1985 | Urbutis et al. ........... | 138/118.1 |
| 4,570,301 A | 2/1986 | Beckman et al. | |
| 4,873,748 A * | 10/1989 | Evyan et al. ............ | 138/118.1 |
| 4,920,611 A * | 5/1990 | Townsend ..................... | 452/45 |
| 5,013,279 A * | 5/1991 | Southworth .................. | 452/46 |
| 5,197,914 A * | 3/1993 | Powers ........................ | 452/32 |
| 5,512,012 A * | 4/1996 | Lendle et al. ................. | 452/35 |
| 5,709,599 A * | 1/1998 | Christensen ................. | 452/34 |
| 5,916,019 A | 6/1999 | Whittlesey | |
| 6,132,302 A | 10/2000 | Hiller et al. | |
| 6,146,261 A | 11/2000 | Bienert et al. | |
| 6,439,990 B1 * | 8/2002 | Kasai et al. .................. | 452/46 |
| 6,585,580 B1 | 7/2003 | Hergott et al. | |
| 6,638,154 B1 * | 10/2003 | Misiewicz et al. ............ | 452/35 |
| 6,659,853 B1 * | 12/2003 | Hergott et al. ................ | 452/31 |
| 2002/0137451 A1 | 9/2002 | Kasai et al. | |
| 2004/0116060 A1 | 6/2004 | Cate et al. | |

FOREIGN PATENT DOCUMENTS

| | | |
|---|---|---|
| EP | 0 340 775 A1 | 8/1989 |
| JP | 111330799 | 11/1999 |

* cited by examiner

*Primary Examiner*—Thomas Price

(57) ABSTRACT

A machine for stuffing natural casings with emulsion, the machine having an emulsion stuffing tube with a first end and a discharge end for extruding emulsion into a casing on an outer surface of the stuffing tube, the stuffing tube extending through a twisting mechanism proximate the discharge end; and a follower having an insert with a central bore that slidably receives the stuffing tube wherein the insert has an outer surface and a receiving chamber with a diameter less than a diameter of the outer surface.

13 Claims, 3 Drawing Sheets

METHOD AND MEANS FOR STUFFING NATURAL CASINGS WITH SAUSAGE EMULSION

BACKGROUND OF THE INVENTION

The present invention relates to sausage encasing machines and, more specifically, to a method and means for stuffing natural casings with food products.

Sausages have been traditionally made by filling the natural intestines of sheep or other animals, with a sausage product whereupon the filled natural casing was formed into links for cooking. In more modern times, sausages are predominantly made by introducing an emulsion into an artificial casing, which encases the sausage material through linking and preliminary cooking. Machines for making sausages with artificial casings have a high volume capability (up to 30,000 sausages per hour). Efforts have been made to use these high-speed machines with natural casings. However, because of the nature of the natural casings including their relatively shorter and variable length and non-uniform diameter, modern sausage encasing machines have not achieved the volume and capacity with natural casings as they do with artificial casings.

U.S. Pat. Nos. 6,585,580 and 6,659,853, both to Hergott et al., disclose sausage making machines whereby a follower slidably advances the natural casing towards a twisting mechanism. A sensor adjacent the twisting mechanism controls the operation of the follower to reduce tearing of the natural casing upon entering the twisting mechanism.

One disadvantage of conventional sausage making machines, such as those disclosed by the '580 and '853 patents, is that as the follower moves toward the twisting mechanism the casing becomes inverted which increases the potential for tearing. In addition, because of the shape of the follower, the casing, at the end of the follower, tends to be more bulky than necessary which leads to waste.

In addition, when the casing is bunched, a portion extends into the chuck and a bulky section forms which is withdrawn from the stuffing tube before being filled which also leads to waste. Natural casing is expensive so even a small amount of waste reduces profitability.

Another disadvantage of conventional sausage making machines is that the optical sensor used to detect the thickness of the casing often becomes covered by residual portions of casing falling from the stuffing tube overhead, thereby rendering the sensor ineffective. The sensor then must be manually cleaned, which increases production time. Thus, there is a need in the art for an improved sausage making machine.

It is therefore a principal object of this invention to provide a sausage making machine that minimizes the amount of natural casing wasted during production.

A further object of this invention is to provide a sausage making machine having an improved follower and twisting mechanism that reduces the amount of tearing.

Still a further object of this invention is to provide a sausage making machine having a sensor that resists blockage from residual casing material.

These and other objects will be apparent to those skilled in the art.

BRIEF SUMMARY OF THE INVENTION

The present invention is directed towards a machine for stuffing natural casings with emulsion. An emulsion stuffing tube is provided having a first end and a discharge end for extruding emulsion into a casing on an outer surface of the stuffing tube, the stuffing tube extending through a twisting mechanism proximate the discharge end. Additionally, a follower is provided having an insert with a central bore that slidably receives the stuffing tube wherein the insert has an outer surface and a receiving chamber with a diameter less than a diameter of the outer surface. A similar insert is received within the twisting mechanism. Further, a sensor is provided adjacent the twisting mechanism wherein a port is adjacent the sensor for directing a stream of air on the casing either straight at the casing at a 90° degree angle or back towards the casing at an angle less than 90° degrees. Two air ports are mounted near the sensor, one to project air to keep the sensor free of obstructions, the second to project air either straight or at an angle onto the casing to reduce shirring.

DESCRIPTION OF THE PREFERRED EMBODIMENTS OF THE INVENTION

Figure 1:
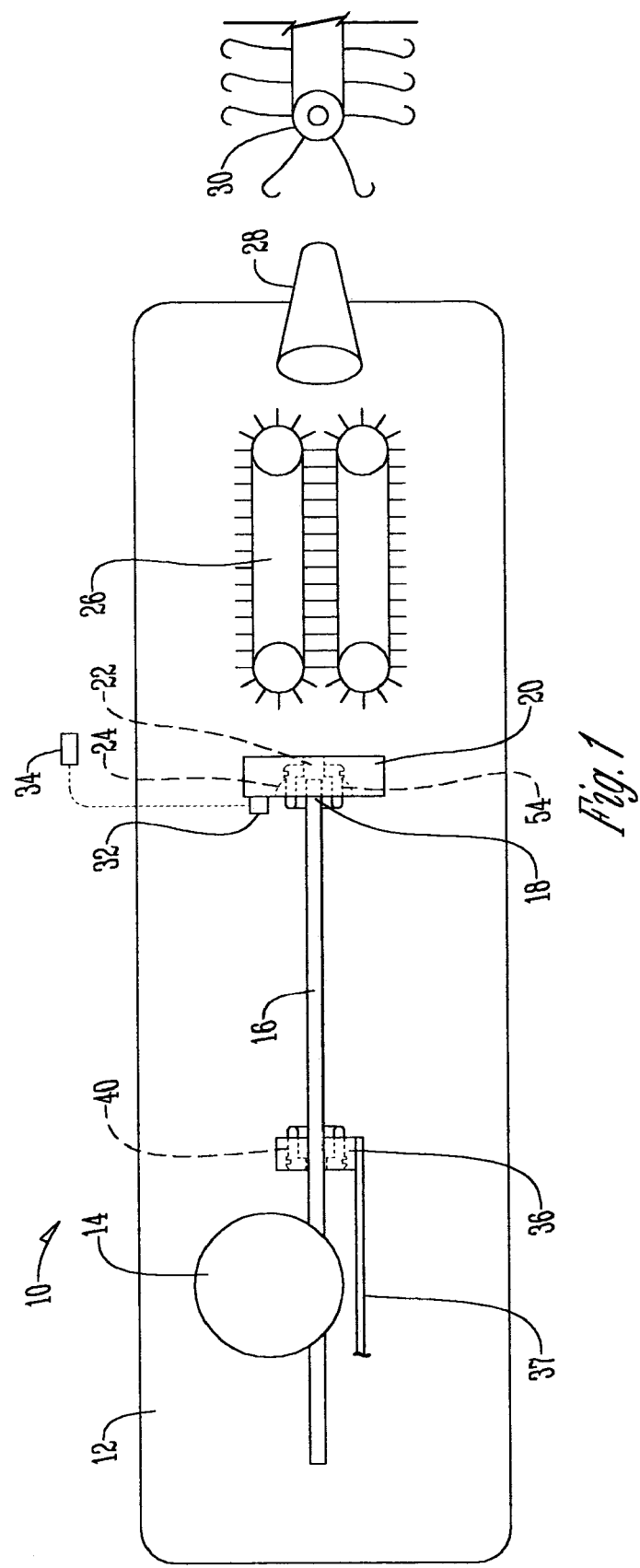
FIG. 1 is a plan view of a sausage making machine of the present invention.

The term "emulsion" as used herein includes meat or any other edible substance. al. and incorporated herein by reference. Specifically, the machine 10 has a frame 12, a pump 14 connected to a source of emulsion (not shown), a slidable stuffing tube 16 having a discharge end 18, a twisting mechanism 20 having a center bore 22 and a chuck 24, a linking mechanism 26, a discharge horn 28, and a conveyor 30. A sensor 32 is adapted to send a signal to a controller 34 to control various components of the machine as described hereafter.

Figure 2:
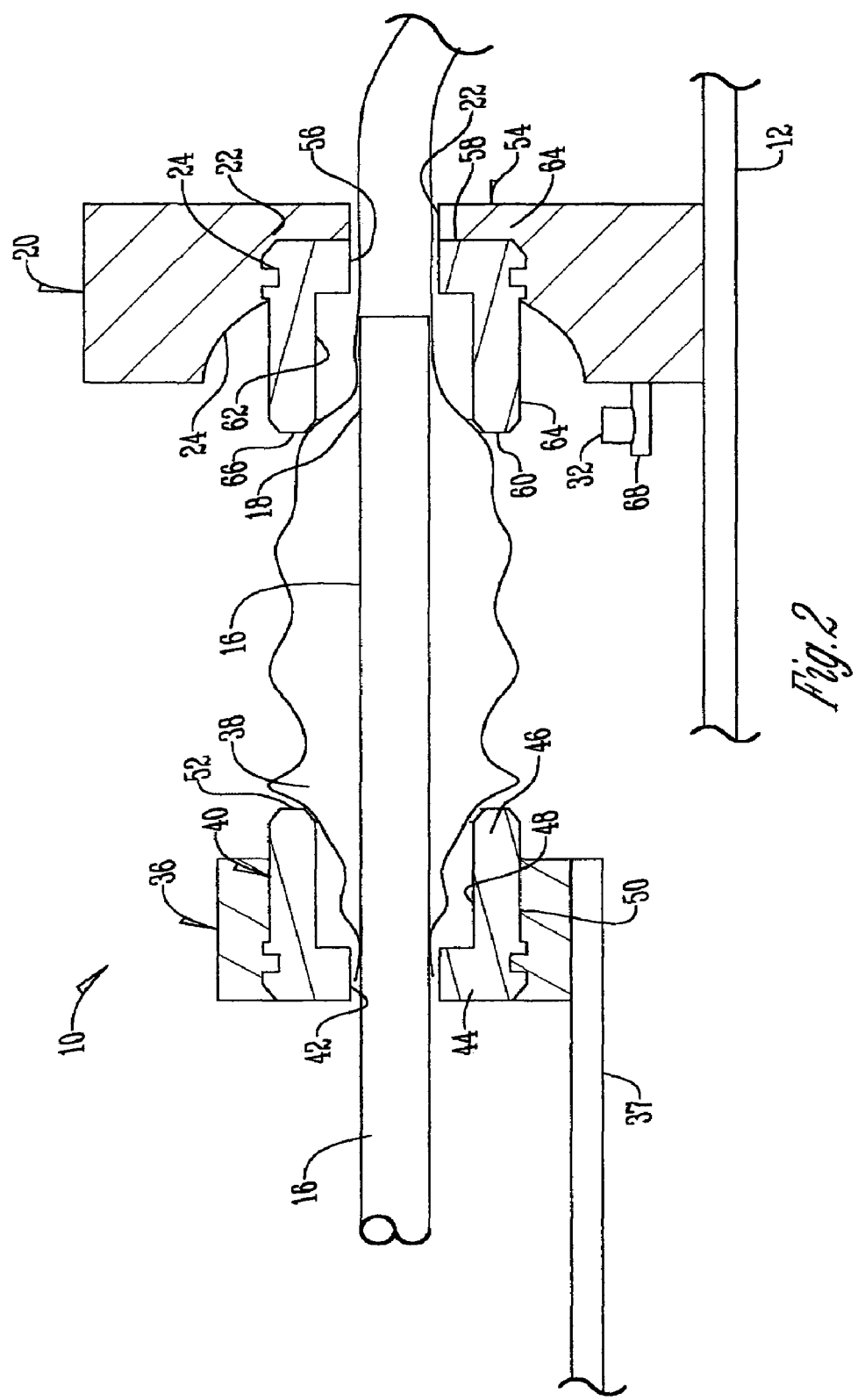
FIG. 2 is a partial sectional longitudinal view showing the forward end of the stuffing tube adjacent the twisting mechanism of the present invention with the follower and chuck inserts shown in section.

A follower 36 is slidably mounted on stuffing tube 16 for advancing a natural casing 38 towards discharge end 18 of the stuffing tube 16 and into the twisting mechanism 20. Follower 36 is advanced along stuffing tube 16 by arm 37, which is driven by any conventional means known in the art. Follower 36 has an insert 40, as best shown in FIG. 2. Insert 40 has a central bore 42 extending between an insert end 44 and a receiving end 46 that receives stuffing tube 46. The central bore has a portion of greater diameter toward the receiving end that forms a receiving chamber 48. The receiving chamber 48 can be formed in any shape. The diameter of the receiving chamber 48 at the receiving end 46 of the insert 40 is less than an outer diameter on the outer surface 50 of the insert 40 which forms an annular shoulder 52 at the receiving end 46 of the insert 40.

Twisting mechanism 20 has a chuck 24 that receives an insert 54, as best shown in FIG. 2. Chuck 24 retains insert 54 and performs in a manner similar to that disclosed in U.S. Pat. No. RE 37,883 to Townsend incorporated herein by reference. Insert 54 has a central bore 56 that extends between an insert end 58 and a receiving end 60. The central bore 56 has a portion of greater diameter toward the receiving end 60 that forms a receiving chamber 62. The receiving chamber 62 can be formed in any shape. The diameter of the receiving chamber 62 at the receiving end 60 of the insert 54 is less than a diameter on the outer surface 64 which forms an annular shoulder 66 at the receiving end 60 of the insert 54.

Figure 3:
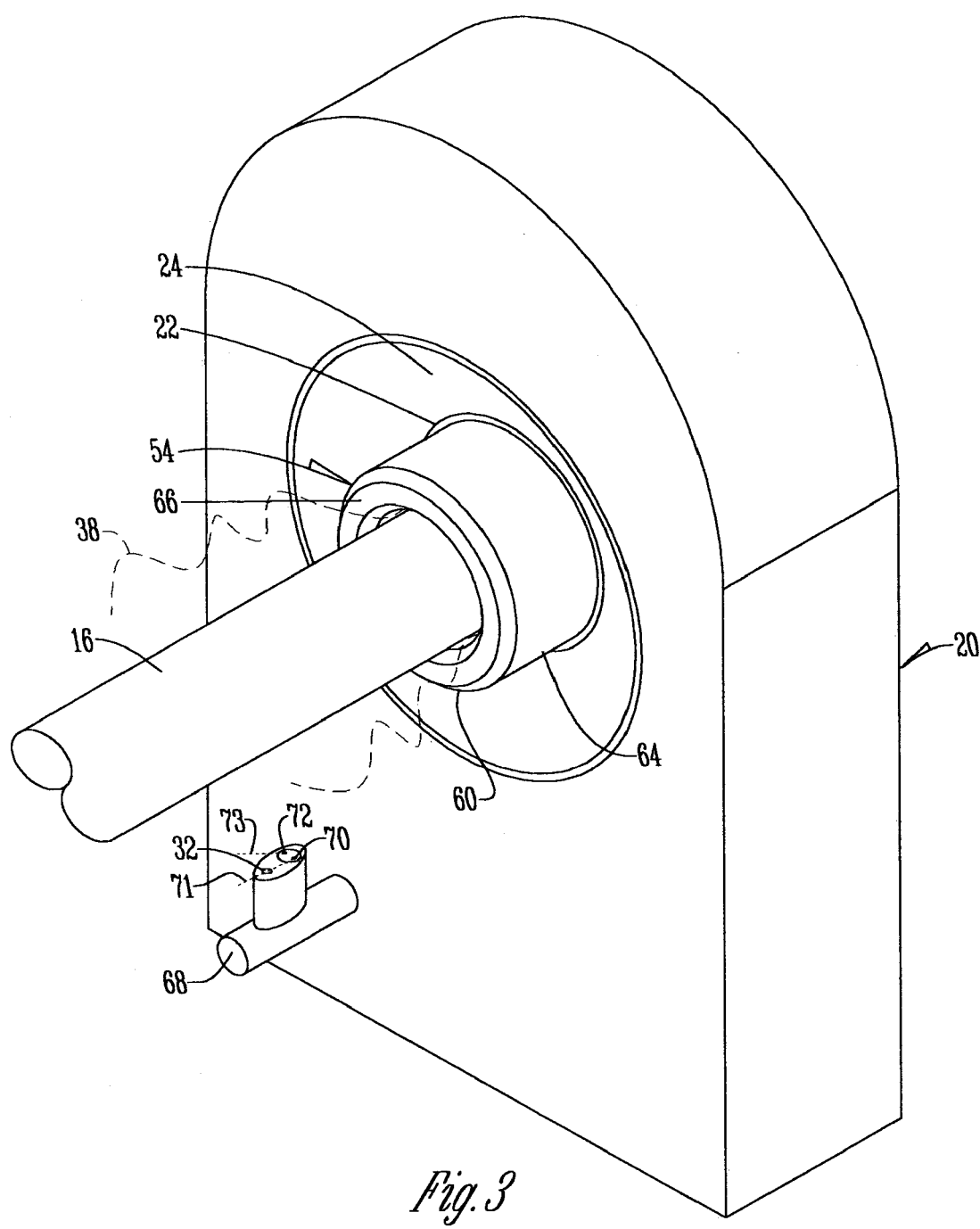
FIG. 3 is a perspective view of the twisting mechanism and sensor of the present invention.

The sensor 32 is mounted on sensor mount 68 adjacent the twisting mechanism 20, as shown in FIGS. 2 and 3. The sensor performs essentially the same as that disclosed in the '580 and '853 patents. Specifically, when the casing 38 is shirred it has a larger diameter than when it is in a non-shirred condition. The upper and lower limits of the desired diameter for the shirred casing are adjustable within the software of the controller 34. The sensor 32 detects a change in the diameter of the casing 38 and sends a signal to the controller 34. Based on the signal the controller 34 controls the movement of the follower 36 by advancing the follower 36 when the diameter of the casing 38 is less than desired and stopping or retracting the follower when the desired diameter is present. In addition, the sensor 32 detects a colored portion of the stuffing tube 16 when the casing 38 becomes sufficiently translucent as the casing 38 is about to depart the discharge end 18 of the stuffing tube 16. Once the colored portion is detected, the sensor 32 sends a signal to the controller 34 which in turn signals the pump to cease operation.

A first port 70 is mounted adjacent to the sensor 32 in the sensor mount 68, as shown in FIG. 3. First port 70 is operatively connected to compressed air (not shown) and directs a stream of air 71 over the sensor 32. In this arrangement, the stream of air 71 from first port 70 prevents the sensor 32 from being covered or otherwise blocked by residual casing material 38 that typically falls from the stuffing tube 16 during operation.

A second port 72 is mounted adjacent to the sensor 32 and first port 70 in the sensor mount 68, as shown in FIG. 3. Second port 72 is operatively connected to compressed air (not shown) and directs a stream of air 73 onto the casing 38. As shown in FIG. 3, the second port 72 directs the stream of air 73 onto the casing 38 at an angle with respect to the longitudinal axis of the stuffing tube 16. In this arrangement, the stream of air 73 from second port 72 assists in preventing shirring of the casing 38, particularly when the follower 36 retracts, and as the casing 38 enters the insert 54.

In operation, once a casing has been mounted on the stuffing tube 16 over the discharge end 18, the controller 34 slidably advances the follower 36 via arm 37 over the stuffing tube in a direction toward the twisting mechanism 20. As the follower advances, the annular shoulder 52 of insert 40 engages the casing 38 and pushes the casing 38 towards the twisting mechanism 20. As the shoulder 52 pushes the casing 38 toward the twisting mechanism 20, most of the casing is shirred while a non-shirred portion is received within the receiving chamber 48 of insert 40. When the casing 38 reaches the twisting mechanism 20, the casing 38 engages the shoulder 66 of insert 54 which assists in shirring most of the casing 38 to a desired diameter based on the diameter detected by sensor 32. In addition, a non-shirred portion of the casing 38 is received in receiving chamber 62 of insert 54. By providing a non-shirred portion within receiving chamber 62 of insert 54, as the casing 38 is filled with emulsion discharged from the stuffing tube 16, the possibility that a shirred or bulky portion of the casing 38 being drawn into the twisting mechanism 20 is greatly reduced. 16, the possibility that a shirred or bulky portion of the casing 38 being drawn into the twisting mechanism 20 is greatly reduced.

Sensor 32 monitors the thickness of the natural casing 38 adjacent the twisting mechanism 20 to ensure the casing 38 is maintained at the desired diameter. When the diameter of the shirred portion of the casing 38 is within a desired range, the sensor 32 sends a signal to controller 34, which stops or retracts the follower 36. A stream of air 71 from first port 70 prevents sensor 32 from becoming blocked by residual casing 38 falling from the stuffing tube 16 during operation. Also, stream of air 73 from second port 72 is directed either straight at the casing if at a 90° angle or at an angle less than 90° degrees to assist in blowing the casing away from the twisting mechanism 20 to assist in reducing the possibility that the shirred portion is received within the twisting mechanism 20.

As the casing 38 continues to fill with emulsion, sensor 32 will monitor the diameter of the shirred portion. Should the diameter fall below a desired limit, the sensor 32 will send a signal to the controller 34 which in turn will move the follower 36 via arm 37 toward the twisting mechanism 20 until the shirred portion of the casing 38 is at the desired diameter.

When the casing 38 is about to depart the discharge end 18 of the stuffing tube 16, the sensor 32 will detect the colored portion of tube 16 through the unshirred portion of the casing that was initially received within receiving chamber 48 of insert 40 and signals the controller which in turn will signal the pump 12 to cease operation. By providing a non-shirred portion of the casing formed within receiving chamber 48, the ability of the sensor 32 to detect casing departing the discharge end 18 of the stuffing tube 16.

It is therefore seen that by the use of an improved follower and twisting mechanism, this invention achieves its stated objectives.

What is claimed is:

1. A machine for stuffing natural casings with emulsion comprising:
    an emulsion stuffing tube on the machine having a first end and a discharge end for extruding emulsion into a casing on an outer surface of the stuffing tube, the stuffing tube extending through a twisting mechanism proximate the discharge end;
    a follower having an insert with a central bore that slidably receives the stuffing tube;
    the insert having an outer surface and a receiving chamber with a diameter less than a diameter of the outer surface; and
    wherein the outer surface of the insert forms an annular shoulder for engaging and pushing the casing.

2. The device of claim 1 further comprising an insert disposed within a chuck of the twisting mechanism having an outer surface and a receiving chamber with a diameter less than a diameter of the outer surface.

3. The device of claim 1 further comprising a sensor adjacent the twisting mechanism and a port adjacent the sensor for directing a stream of air over the sensor.

4. The device of claim 1 further comprising a sensor adjacent the twisting mechanism and a port adjacent the sensor for directing a stream of air on the casing.

5. The device of claim 4 wherein the stream of air is directed on the casing at an angle.

6. A machine for stuffing natural casings with emulsion comprising:
    an emulsion stuffing tube on the machine having a first end and a discharge end for extruding emulsion into a casing on an outer surface of the stuffing tube, the stuffing tube extending through a twisting mechanism proximate the discharge end;

an insert disposed within a chuck of the twisting mechanism having an outer surface and a receiving chamber with a diameter less than a diameter of the outer surface; and a sensor adjacent the twisting mechanism and a port adjacent the sensor for directing a stream of air over the sensor.

7. The device of claim 6 further comprising a sensor adjacent the twisting mechanism and a port adjacent the sensor for directing a stream of air on the casing.

8. The device of claim 6 wherein the stream of air is directed on the casing at an angle.

9. A machine for stuffing natural casings with emulsion comprising:

an emulsion stuffing tube on the machine having a first end and a discharge end for extruding emulsion into a casing on an outer surface of the stuffing tube, the stuffing tube extending through a twisting mechanism proximate the discharge end;

a sensor adjacent the twisting mechanism; and a port adjacent the sensor for directing a stream of air on the casing.

10. The device of claim 9 wherein the stream of air is directed on the casing at an angle.

11. The device of claim 9 further comprising a second port adjacent the sensor for directing a stream of air over the sensor.

12. The device of claim 9 further comprising a follower having an insert with a central bore that slidably receives the stuffing tube, the insert having an outer surface and a receiving chamber with a diameter less than a diameter of the outer surface.

13. The device of claim 9 further comprising an insert disposed within a chuck of the twisting mechanism having an outer surface and a receiving chamber with a diameter less than a diameter of the outer surface.

* * * * *